United States Patent
Guday et al.

(10) Patent No.: US 9,161,200 B2
(45) Date of Patent: Oct. 13, 2015

(54) MANAGING NETWORK DATA TRANSFERS IN VIEW OF MULTIPLE DATA USAGE PLANS

(71) Applicant: Microsoft Corporation, Redmond, WA (US)

(72) Inventors: Shai Guday, Redmond, WA (US); Gil Zalmanovitch, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 44 days.

(21) Appl. No.: 13/721,058

(22) Filed: Dec. 20, 2012

(65) Prior Publication Data

US 2013/0196621 A1    Aug. 1, 2013

Related U.S. Application Data

(60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.
*H04M 11/00* (2006.01)
*H04W 4/26* (2009.01)
(Continued)

(52) U.S. Cl.
CPC ............. *H04W 4/26* (2013.01); *H04L 12/1435* (2013.01); *H04L 43/04* (2013.01);
(Continued)

(58) Field of Classification Search
CPC ................................. H04W 4/24; H04W 28/00
USPC .................................................. 455/406, 405
See application file for complete search history.

(56) References Cited

U.S. PATENT DOCUMENTS

| 5,778,182 A | 7/1998 | Cathey et al. |
| 6,308,328 B1 | 10/2001 | Bowcutt et al. |

(Continued)

FOREIGN PATENT DOCUMENTS

| WO | 2008/097105 A1 | 8/2008 |
| WO | 2008/155444 A1 | 12/2008 |

(Continued)

OTHER PUBLICATIONS

Unuth, Nadeem, "Data Usage Monitor Apps for Your iPhone and iPad", Retrieved at <<http://voip.about.com/od/voipbandwidth/tp/Data-Usage-Monitor-Apps-For-Your-Iphone-And-Ipad.htm>>, Retrieved Date: Oct. 9, 2012, p. 1.

(Continued)

*Primary Examiner* — David Q Nguyen
(74) *Attorney, Agent, or Firm* — Sunah Lee; Kate Drakos; Micky Minhas (57) ABSTRACT

Embodiments manage data transfers using a plurality of data usage plans available to a computing device. Each of the data usage plans has data usage statistics representing an amount of network data consumed under the data usage plan. For each data transfer request received from applications executing on the computing device, a service executing on the computing device or in a cloud defines a network data transfer configuration for performing the data transfer request. The network data transfer configuration is defined based on, for example, the data usage plans, the data usage statistics, and the data transfer request to reduce transfer costs and/or provide a particular quality of service (QoS).

20 Claims, 4 Drawing Sheets

(51) Int. Cl.
*H04W 24/02* (2009.01)
*H04L 12/26* (2006.01)
*H04M 15/00* (2006.01)
*H04L 12/14* (2006.01)
*H04W 8/18* (2009.01)
*H04M 1/725* (2006.01)

(52) U.S. Cl.
CPC .......... *H04L 43/0876* (2013.01); *H04M 15/58* (2013.01); *H04M 15/83* (2013.01); *H04M 15/84* (2013.01); *H04M 15/846* (2013.01); *H04M 15/85* (2013.01); *H04M 15/86* (2013.01); *H04W 24/02* (2013.01); *H04L 43/045* (2013.01); *H04M 1/72522* (2013.01); *H04M 15/775* (2013.01); *H04M 15/8044* (2013.01); *H04M 15/854* (2013.01); *H04M 15/856* (2013.01); *H04W 8/18* (2013.01)

(56) References Cited

U.S. PATENT DOCUMENTS

| | | | |
|---|---|---|---|
| 7,184,749 B2 | 2/2007 | Marsh et al. | |
| 7,277,938 B2 | 10/2007 | Duimovich et al. | |
| 7,320,131 B1 | 1/2008 | O'Toole, Jr. | |
| 7,406,596 B2 | 7/2008 | Tararukhina et al. | |
| 7,418,532 B2 | 8/2008 | Suzuki et al. | |
| 7,532,571 B1 | 5/2009 | Price et al. | |
| 7,720,727 B2 | 5/2010 | Keyes et al. | |
| 7,904,080 B2 | 3/2011 | Atkins et al. | |
| 7,986,935 B1 | 7/2011 | D'Souza et al. | |
| 8,064,876 B2 * | 11/2011 | Knight | 455/406 |
| 8,359,389 B1 | 1/2013 | Cohen et al. | |
| 8,484,568 B2 * | 7/2013 | Rados et al. | 715/745 |
| 2002/0029273 A1 | 3/2002 | Haroldson et al. | |
| 2002/0082991 A1 | 6/2002 | Friedman et al. | |
| 2002/0090926 A1 | 7/2002 | Pirkola et al. | |
| 2003/0066055 A1 | 4/2003 | Spivey | |
| 2003/0115385 A1 | 6/2003 | Adamane et al. | |
| 2003/0186706 A1 | 10/2003 | Bergins et al. | |
| 2004/0111712 A1 | 6/2004 | Humpert et al. | |
| 2004/0153587 A1 | 8/2004 | Choi | |
| 2004/0176965 A1 | 9/2004 | Winch et al. | |
| 2004/0199634 A1 | 10/2004 | Jackowski et al. | |
| 2006/0141983 A1 | 6/2006 | Jagannathan et al. | |
| 2006/0211404 A1 | 9/2006 | Cromp et al. | |
| 2007/0211674 A1 | 9/2007 | Ragnar Karlberg et al. | |
| 2007/0294562 A1 | 12/2007 | Takamatsu et al. | |
| 2008/0318621 A1 * | 12/2008 | Fan et al. | 455/552.1 |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0081996 A1 | 3/2009 | Duggal et al. | |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 | 8/2009 | Peracha | |
| 2009/0203352 A1 | 8/2009 | Fordon et al. | |
| 2009/0285201 A1 | 11/2009 | Ben-Haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0180190 A1 | 7/2010 | Carroll | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0047620 A1 | 2/2011 | Mahaffey et al. | |
| 2011/0070898 A1 | 3/2011 | Sanjeev et al. | |
| 2011/0087985 A1 | 4/2011 | Buchanan et al. | |
| 2011/0137776 A1 | 6/2011 | Goad et al. | |
| 2011/0145920 A1 | 6/2011 | Mahaffey et al. | |
| 2011/0151831 A1 | 6/2011 | Pattabiraman | |
| 2011/0176482 A1 | 7/2011 | Vizor et al. | |
| 2011/0211465 A1 | 9/2011 | Farrugia et al. | |
| 2011/0231551 A1 | 9/2011 | Hassan et al. | |
| 2011/0238826 A1 | 9/2011 | Carre et al. | |
| 2011/0244826 A1 | 10/2011 | Krishnan et al. | |
| 2011/0275344 A1 | 11/2011 | Momtahan et al. | |
| 2011/0276442 A1 | 11/2011 | Momtahan et al. | |
| 2011/0300865 A1 | 12/2011 | Kashikar et al. | |
| 2012/0054661 A1 | 3/2012 | Rados et al. | |
| 2012/0101952 A1 | 4/2012 | Raleigh et al. | |
| 2012/0142310 A1 | 6/2012 | Pugh et al. | |
| 2012/0155296 A1 | 6/2012 | Kashanian | |
| 2012/0158947 A1 | 6/2012 | Hassan et al. | |
| 2012/0163232 A1 | 6/2012 | Yoo | |
| 2012/0198046 A1 | 8/2012 | Shah et al. | |
| 2012/0208495 A1 | 8/2012 | Lawson et al. | |
| 2012/0278194 A1 | 11/2012 | Dewan et al. | |
| 2012/0290584 A1 | 11/2012 | De Bona et al. | |
| 2012/0315872 A1 | 12/2012 | Amato et al. | |
| 2013/0023230 A9 | 1/2013 | Momtahan et al. | |
| 2013/0054378 A1 * | 2/2013 | Hao et al. | 705/14.66 |
| 2013/0060653 A1 | 3/2013 | Sharkey | |
| 2013/0117846 A1 | 5/2013 | Mahaffey et al. | |
| 2013/0122882 A1 | 5/2013 | Patel et al. | |
| 2013/0149994 A1 | 6/2013 | Gaddam et al. | |

FOREIGN PATENT DOCUMENTS

| | | |
|---|---|---|
| WO | 2012/083285 A2 | 6/2012 |
| WO | 2012/162419 A1 | 11/2012 |

OTHER PUBLICATIONS

Blass, "Exclusive: Windows Phone 8 Detailed", Retrieved from <<http://pocketnow.com/windows-phone/exclusive-windows-phone-8-detailed>>, Feb. 2, 2012, pp. 2.

Sinofsky, "Engineering Windows 8 for Mobile Networks", Retrieved from <<http://blogs.msdbn.com/b/b8/archive/2012/01/20/engineering-windows-8-for-mobility.aspx>>, Jan. 20, 2012, pp. 28.

"Non-Final Office Action Issued in U.S. Appl. No. 13/721,029", Mailed Date: Mar. 11, 2014, filed Dec. 20, 2012, 14 Pages.

"International Search Report & Written Opinion for PCT Patent Application No. PCT/US2013/022353", Mailed Date: May 15, 2013, Filed Date: Jan. 21, 2013, 10 Pages.

Heikkinen, et al., "Measuring Mobile Peer-to-Peer Usage: Case Finland 2007", In Proceedings of the 10th International Conference on Passive and Active Network Measurement, Mar. 2009, pp. 165-174.

"Non-Final Office Action Issued in U.S. Appl. No. 13/721,053", Mailed Date: Mar. 18, 2014, filed Dec. 20, 2012, 8 Pages.

"International Search Report & Written Opinion for PCT Patent Application No. PCT/US2013/022822", Mailed Date: Apr. 25, 2013, Filed Date: Jan. 24, 2013, 9 Pages.

Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.

Peddemors, Arjan, "Network Resource Awareness and Prediction on Mobile Devices", Novay PhD. Research Series, No. 026 (Novay/PRS/026), Oct. 2009, 236 Pages.

Balasubramanian, Aruna, "Architecting Protocols to Enable Mobile Applications in Diverse Wireless Networks", A Dissertation Submitted to the Graduate School of the University of Massachusetts Amherst in Partial Fulfillment of the requirements for the Degree of Doctor of Philosophy, Feb. 2011, 198 Pages.

"Non-Final Office Action Issued in U.S. Appl. No. 13/721,041", Mailed Date: Mar. 28, 2014, filed Dec. 20, 2012, 15 Pages.

"Non-Final Office Action Issued in U.S. Appl. No. 13/721,069", Mailed Date: Mar. 14, 2014, filed Dec. 20, 2012, 15 Pages.

"Non-Final Office Action Issued in U.S. Appl. No. 13/721,023", Mailed Date: Mar. 28, 2014, filed Dec. 20, 2012, 16 Pages.

"Rapid Mobile Data Service Creation and Monetization", Retrieved at <<http://www.amdocs.com/Products/network-control/Documents/data-experience-solution-datasheet.pdf>>, 2012, 7 Pages.

"Non-Final Office Action Issued in U.S. Appl. No. 13/721,032", Mailed Date: Feb. 6, 2014, filed Dec. 20, 2012, 11 Pages.

(56) References Cited

OTHER PUBLICATIONS

"Final Office Action Issued in U.S. Appl. No. 13/721,023", Mailed Date: Oct. 27, 2014, filed Dec. 20, 2012, 16 Pages.
"Non-Final Office Action Issued in U.S. Appl. No. 13/721,032", Mailed Date: Aug. 5, 2014, filed Dec. 20, 2012, 16 Pages.
"Applicant Initialed Interview Summary Issued in U.S. Appl. No. 13/721,053", Mailed Date: May 30, 2014, filed Dec. 20, 2012, 3 pages.
"Examiner Initialed Interview Summary Issued in U.S. Appl. No. 13/721,053", Mailed Date: Aug. 19, 2014, filed Dec. 20, 2012, 2 pages.
Notice of Allowance Issued in U.S. Appl. No. 13/721,053, Mailed Date: Aug. 19, 2014, filed Dec. 20, 2012, 14 Pages.
Notice of Allowance Issued in U.S. Appl. No. 13/721,053, Mailed Date: Oct. 28, 2014, filed Dec. 20, 2012, 7 Pages.
"Final Office Action Issued in U.S. Appl. No. 13/721,029", Mailed Date: Oct. 1, 2014, filed Dec. 20, 2012, 19 Pages.
"Supplementary Search Report Issued in European Patent Application No. 13741434.8", Mailed Date: Sep. 30, 2014, 3 Pages.
"Supplementary Search Report Issued in European Patent Application No. 13741633.5", Mailed Date: Sep. 18, 2014, 3 Pages.
"Final Office Action Issued in U.S. Appl. No. 13/721,069", Mailed Date: Nov. 28, 2014, filed Dec. 20, 2012, 23 Pages.
"DataMan Pro for iPad—Analyze your 3G Data Usage on Your Computer", Published on: Jul. 9, 2011, Available at: http://prmac.com/release-id-27794.htm, 2 pages.
"Mobile Data Usage Meter—Manage Mobile Data Usage & Wireless Broadband Devices", Published on: Dec. 28, 2009, Available at: http://web.archive.org/web/20091228092436/http://www.telstrabusiness.com/business/portal/online/site/myaccount/mobiledatausagemeter.94003, 2 pages.
"My Data Usage Pro", Retrieved on: Dec. 12, 2014, Available at: http://download.cnet.com/My-Data-Usage-Pro/3000-2094_4-75402502.html, 3 pages.
Rhee, Ed, "How to Track Data Usage on your Android Phone", Published on: Jul. 8, 2011, Available at: http://www.cnet.com/how-to/how-to-track-data-usage-on-your-android-phone, 4 pages.
"Non-Final Office Action Issued in U.S. Appl. No. 13/721,023", Mailed Date: Feb. 13, 2015, 19 Pages.
"Non-Final Office Action Issued in U.S. Appl. No. 13/721,029", Mailed Date: Mar. 17, 2015, 25 Pages.
"Non-Final Office Action Issued in U.S. Appl. No. 13/721,041", Mailed Date: Jan. 7, 2015, 21 Pages.
"Non-Final Office Action Issued in U.S. Appl. No. 13/721,066", Mailed Date: Feb. 13, 2015, 17 Pages.
"Office Action Issued in European Patent Application No. 13741434.8", Mailed Date: Nov. 27, 2014, 6 Pages.
"Office Action Issued in European Patent Application No. 13741633.5", Mailed Date: Nov. 27, 2014, 7 Pages.
"Notice of Allowance Issued in U.S. Appl. No. 13/721,032", Mailed Date: Jan. 30, 2015, 13 Pages.
"Non-Final Office Action Issued in U.S Appl. No. 13/721,069", Mailed Date: Jul. 7, 2015, 27 pages.
"Non-Final Office Action Issued in U.S Appl. No. 13/721,083", Mailed Date: Jun. 5, 2015, 10 pages.
"Non-Final Office Action Issued in U.S Appl. No. 14/642,378", Mailed Date: Jun. 12, 2015, 12 pages.
"International Preliminary Report on Patentability Issued in PCT Application No. PCT/US13/22822", Mailed Date: Aug. 7, 2014, 6 pages.
"International Preliminary Report on Patentability Issued in PCT Application No. PCT/US13/22353", Mailed Date: Aug. 7, 2014, 7 pages.

* cited by examiner

MANAGING NETWORK DATA TRANSFERS IN VIEW OF MULTIPLE DATA USAGE PLANS

CROSS-REFERENCE TO RELATED APPLICATIONS

This application claims the benefit of pending U.S. Provisional Application No. 61/696,472, filed Sep. 4, 2012, pending U.S. Provisional Application No. 61/591,503, filed Jan. 27, 2012, and pending U.S. Provisional Application No. 61/591,509, filed Jan. 27, 2012. The entirety of these provisional applications is hereby incorporated by reference herein.

This application is related to the following applications: U.S. patent application entitled "Tracking Data Usage Under a Schematized Data Usage Plan," U.S. patent application entitled "Managing Data Transfers Over Network Connections Based on Priority and a Data Usage Plan," U.S. patent application entitled "On-Device Attribution of Network Data Usage," U.S. patent application entitled "Predicting Network Data Consumption Relative to Data Usage Patterns," U.S. patent application entitled "Updating Dynamic Data Usage Plans and Statistics," U.S. patent application entitled "Data Usage Profiles for Users and Applications," U.S. patent application entitled "Recommendations for Reducing Data Consumption Based on Data Usage Profiles," and U.S. patent application entitled "Dynamically Adjusting a Data Usage Plan Based on Data Usage Statistics." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering unlimited mobile data plans to offering capped and metered plans. With some of the capped and metered plans, the fees for exceeding the allotted data caps may be significant. While some existing web browsers attempt to optimize data traffic, the existing systems generally lack mechanisms for balancing specific needs of each user with data transfer costs. Further, existing systems fail to consider the multiple mobile data plans that may be available to the user.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure manage a plurality of data usage plans available to a computing device for data transfer. Each of the plurality of data usage plans has data usage statistics representing an amount of network data consumed under the data usage plan. Upon receipt of a data transfer request from an application executing on the computing device, a mobile operator and network connection are selected based at least on the plurality of data usage plans, the associated data usage statistics, and the received data transfer request. The data transfer request is initiated using the selected mobile operator and network connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide efficient routing of network data traffic over multiple networks 109 using multiple data usage plans 116 to manage data consumption. In particular, plan aware routing selections are made by determining which data usage plan 116 to leverage for which network data traffic. Aspects of the disclosure operate as a service executing on a mobile computing device 102 and/or as a cloud service. Based at least on the factors, preferences, criteria, or other inputs, the service identifies at least one data usage plan 116, at least one of the networks 109, and mobile operator credentials to present to the identified network 109 for a particular data transfer request 115, in some embodiments.

While some existing systems may make routing decisions based solely on internally sourced measures (e.g., power consumption), aspects of the present disclosure balance externally sourced, relatively static information (e.g., the data usage plans 116 from mobile operators 111) with dynamic runtime information to make routing decisions that are in the best interest of the user 104. The dynamic runtime information may be measurable on the device, highly variable over time, and device-specific. For example, the dynamic runtime information may change over time depending on the device's relationship with the network connections 130 (e.g., in view of the data usage plan 116 of the user 104, and the cost of each network connection 130). In some embodiments, the service performs operations to calculate or estimate the amount of power and network data to be consumed by a data transfer request 115 over multiple different networks 109 each having different data usage plans 116 (e.g., usage allotments, tariffs, etc.). As an example, the financial cost (e.g., dollars) or resource cost (e.g., power consumption) to connect to one cellular tower may differ from the cost to connect to another cellular tower.

Aspects of the disclosure are operable with emerging tariff models such as where traffic is prorated and even subsidized by different applications 114 on different mobile operators 111 (or different plans from the same mobile operators 111). The service is also operable with shared data usage plans 116, such as family plans, and in environments in which applications 114 and services share connections. The service is also operable in embedded subscriber identity module (SIM) environments in which data usage plans 116 are dynamically activated as needed, or the data usage plan 116 of a proximate or neighboring device is used. In some embodiments, an embedded SIM is a software-based SIM residing possibly on the motherboard of the computing device, rather than a SIM residing on the universal integrated circuit card (UICC) in the computing device.

Figure 1:
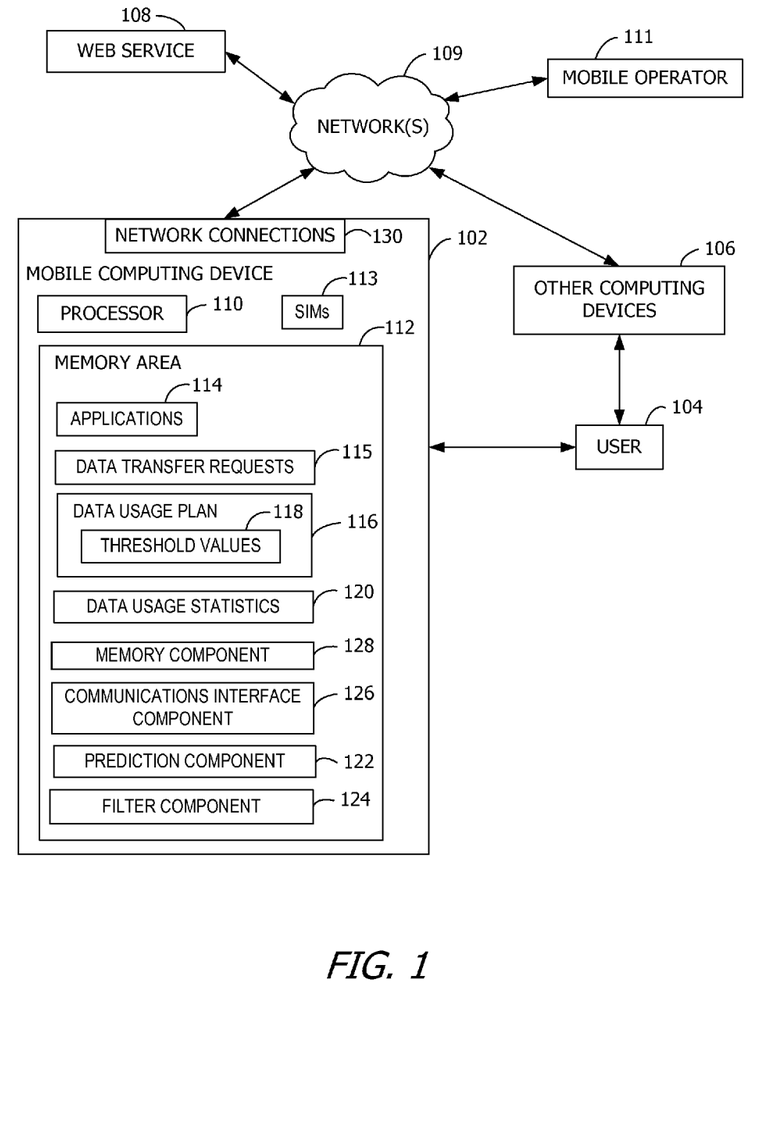
FIG. 1 is an exemplary block diagram illustrating a mobile computing device with multiple available data usage plans.

Referring next to FIG. 1, an exemplary block diagram illustrates the mobile computing device 102 with multiple available data usage plans 116 performing network data transfers via the network 109. Aspects of the disclosure manage data transfers using the plurality of data usage plans 116. User computing devices include, for example, the mobile computing device 102 and other computing devices 106. The user computing devices communicate over one or more of the networks 109. In some embodiments, one or more of the user computing devices are associated with one of the data usage plans 116. The data usage plan 116 represents the terms and/or conditions (e.g., network data consumption allotment) under which the mobile operator 111 provides data transfer services to the user computing devices. For example, a plurality of the user computing devices may share network data consumption allotted under the same or common data usage plan 116.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone (e.g., mobile telephone 602 in FIG. 6), laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108.

In some embodiments, the mobile computing device 102 and the other computing devices 106 are associated with a common data usage plan 116 of the user 104. For example, the mobile computing device 102 may represent the mobile telephone 602 of the user 104, while the other computing devices 106 may include a tablet and a laptop associated with the user 104. In other embodiments, the mobile computing device 102 and each of the other computing devices 106 are associated with separate data usage plans 116.

In some embodiments, each of the user computing devices collects data usage statistics 120 relating thereto. For example, a data transfer service, or other entity executing on the mobile computing device 102, generates, monitors, collects, compiles, and/or receives the data usage statistics 120 relating to network data consumption by the applications 114 executing on the mobile computing device 102. The data usage statistics 120 represent an amount of network data consumed by the mobile computing device 102 under the data usage plan 116. Alternatively or in addition, the centralized web service 108 interacts with the user computing devices and the mobile operators 111 to collect the data usage statistics 120 on each of the user computing device. The web service 108 may further aggregate the data usage statistics 120, such as for shared data usage plans 116. In such embodiments, the web service 108 may receive a schema populated with data relating to the data usage plan 116 from the mobile operator 111, and distribute the populated schema to one or more of the user computing devices associated with the same data usage plan 116.

In some embodiments, the mobile computing device 102 has at least one or more SIMs 113 (e.g., dual SIMs), one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures.

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102.

The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections 130 representing communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic.

The memory area 112 further stores a plurality of data transfer requests 115 received from one or more of the applications 114. The data transfer requests 115 represent requests by the applications 114 for use of at least one of the network connections 130. For example, the data transfer requests 115 represent requests from the applications 114 to upload and/or download data.

The memory area 112 further stores data describing at least one data usage plan 116 associated with the user 104. In some embodiments, the memory area 112 stores a plurality of data usage plans 116. The data describing the data usage plans 116 may be received from the mobile operators 111 offering the data usage plans 116. For example, there may be multiple data usage plans 116 active per network connection 130.

The different data usage plans 116 embody different cost attributes and tariff models. In some embodiments, the mobile operators 111 may have certain applications 114 subsidize the data traffic over certain networks 109. For example, network traffic for Application A may be paid, all or in part, by the developer/owner/publisher of Application A. In another example, Application A may be free on one network 109 while Application B is free on a different network 109. The mobile computing device 102 works with micro-tariffing models such as per-minute charges or per kilobyte charges, as well as per-session charges such as a video call in which the call is metered at a flat rate regardless of the duration of the call. Other billing models are contemplated, such as per-day. The tariff models may differ from network 109 to network 109, from data usage plan 116 to data usage plan 116, and from user 104 to user 104.

The mobile computing device 102 considers the subsidy data, limits, current consumption, and more of each of the data usage plans 116 as input to make a routing selection that reduces network transfer charges to the user 104. The mobile computing device 102 is aware of which application 114 is requesting a network transfer, and matches the request to the network 109 that results in the lowest cost and/or best quality of service (QoS) for the user 104 (e.g., as specified by user 104 or application preferences, or by other entities). In such embodiments, the mobile computing device 102 may switch and route rapidly to address each of the network transfer requests, as further described below.

Some of the data usage plans 116 may be dynamic. Such dynamic data usage plans 116 adapt and change based on usage in multi-SIM environments or in shared environments such as with a family data usage plan 116. The dynamic data usage plans 116 are adjusted over time.

The data usage plan 116 may be represented by a schema (e.g., an extensible markup language schema) or other data structure. For example, the user 104 has contracted with the mobile operator 111 to receive network data transfer services from the mobile operator 111. The data usage plan 116 describes the services provided by the mobile operator 111, such as the amount of network data the user 104 can consume during a particular duration (e.g., a billing time period). For example, the data usage plan 116 describes threshold values 118 associated with the network connections 130 of one or more devices of the user 104. The threshold values 118 represent a maximum amount of network data consumption allotted under the data usage plan 116 for the network connections 130. For example, one threshold value 118 may indicate a maximum amount of network data consumption for a Wi-Fi connection, while another threshold value 118 indicates a maximum amount of network data consumption for a cellular data connection.

The schema or other data structure representing the data usage plan 116 may be defined by the web service 108, by the mobile operator 111, or by another entity. In some embodiments, each of the various data usage plans 116 subscribed to by the mobile computing device 102 and the other computing devices 106 use the same common schema. In general, the schema enables descriptions of the parts, components, services, features, or other aspects of the data usage plan 116 including, but not limited to, multi-rate data plans, peak times, roaming rates, allotted network data consumption per network connection 130, etc. In some embodiments, use of the schema allows the mobile operators 111 to send out updated portions of the schema corresponding to updated parts of a particular data usage plan 116.

In some embodiments, the schema includes a plurality of fields. Each of the threshold values 118 may be associated with one or more of the fields. For example, the fields may correspond to one or more of the following: peak times, off-peak times, peak time network data consumption quota, off-peak time network data consumption quota, peak time network data consumption remaining, off-peak time network data consumption remaining, a roaming rate, rules, a mobile operator name, a billing cycle type, a network connection type, identification of free hosts available for connection, a list of mobile hotspots, and any other elements or information pertaining to the data usage plan 116. The list of free hosts represents zero-rated or reduced cost hosts (e.g., visiting particular web sites does not count against the data usage plan 116).

The schema may also include fields supporting different billing rates per host accessed, per weekend, per night, friends and family rates, peak and off-peak rates, and more. The schema also allows each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema stored by the mobile computing device 102 may also include fields corresponding to the data usage statistics 120 collected, generated, or received by the mobile computing device 102 and/or the mobile operators 111. For example, to facilitate sharing the data usage statistics 120 among the mobile operators 111, web service 108, and/or user computing devices, the mobile operators 111, web service 108, and the user computing devices may populate the schema with the data usage statistics 120.

The memory area 112 further stores the data usage statistics 120 relating to one or more of the data usage plans 116. The data usage statistics 120 may be viewed as a current or instant snapshot of the amount of network data transmitted and/or received (e.g., or otherwise consumed) by the mobile computing device 102. For example, the mobile computing device 102 collects ongoing usage data relating to network data transfers, such as from device radios, drivers, and accelerometers of the mobile computing device 102. The data usage statistics 120 identify, to a granularity of time (e.g., per minute) or data (e.g., per kilobyte), how much data has been sent and/or received by the mobile computing device 102, the time and date of usage (e.g., start and end times), the location of usage, network interface used (e.g., over which network connections 130), roaming state, data usage plan information, the SIM 113 card or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of the target computer (e.g., for whitelist/blacklists in data usage), the application responsible for the data transfer, and the like. In a further example, information relating to text messages, data, voice calls, minutes used, voice over Internet Protocol (VoIP) usage, and any other element of usage consumed by, or that impacts, the mobile computing device 102 is collected to produce the data usage statistics 120. Other data usage statistics 120 are also contemplated.

The data usage statistics 120 may be collected by the mobile computing device 102, the web service 108, and/or the mobile operators 111. For example, the data usage statistics 120 may be compiled directly (e.g., by monitoring network traffic) and/or by collecting the data usage statistics 120 from other devices that perform the collection. In embodiments such as those described below with reference to FIG. 2, FIG. 3, and/or FIG. 4, the data usage statistics 120 corresponding to a plurality of data usage plans 116 are collected such that there may be a plurality of sets of collected data usage statistics 120 (e.g., one set for each data usage plan 116 or user 104).

Alternatively or in addition, the mobile computing device 102 receives updates of network data consumption by the other computing devices 106 sharing the same data usage plan 116. For example, the data usage statistics 120 may represent the network data collectively consumed by the mobile telephone 602, tablet, and laptop of the user 104.

The memory area 112 further stores exemplary computer-executable components such as a memory component 128, a communications interface component 126, a prediction component 122, and a filter component 124. Operation of the computer-executable components, when executed, is described below with reference to FIG. 2.

The mobile computing device 102 may have any quantity of SIMs 113 associated therewith. For example, each of the SIMs 113 may be embedded and implemented as an application program performing operations to implement functionality associated with the SIM 113. In some embodiments, the mobile computing device 102 has dual SIMs 113 with one of the SIMs 113 in standby mode (e.g., dual SIM dual standby). Alternatively or in addition, the mobile computing device 102 has dual SIMs 113 with both of the SIMs 113 being independently active (e.g., dual SIM dual active). Additional examples include virtual SIMs, universal integrated circuit cards (UICCs), and other variants of user identity modules.

Each of the SIMs 113 is associated with at least one of the plurality of data usage plans 116. Aspects of the disclosure operate to leverage the available data usage plans 116 to route network traffic over the network connections 130 using one or more of the SIMs 113. For example, the mobile computing device 102 makes a decision as to which SIM 113 gets attached to which radio in software based upon a data costing analysis. The mobile computing device 102 relies on the data costing analysis (e.g., a comparison of the costs of using the different SIMs 113 on the different radios in view of the data usage plans 116 for each) to determine which of the SIMs 113 should be active to handle the data transfer request 115.

As an example, one of the data transfer requests 115 may represent an incoming voice call on a first data usage plan associated with a first SIM. Aspects of the disclosure may determine to answer the incoming voice call with a second data usage plan of a second SIM. For example, the second data usage plan may provide a reduced cost for the data transfer, and/or a better QoS.

The mobile computing device 102 is further operable with more than one cellular radio. For example, the mobile computing device 102 may include a plurality of radios with at least two of those radios consuming battery power at different rates. In such environments, the mobile computing device 102 selects the mobile operator 111 and network connection 130 for each data transfer request 115 to balance network data usage against battery usage. In an example in which the mobile computing device 102 has a single radio, actively selecting different networks 109 (e.g., via different data usage plans 116) may cause the mobile computing device 102 to connect to different cell towers, which in turn may impact battery usage. For example, connecting to one cell tower may consume more battery power than connecting to another cell tower, which affects the amount of power anticipated to be consumed when performing the data transfer requests 115 over the various network connections 130.

The mobile computing device 102 represents an example of a computing device programmed to perform operations to manage network data transfers using a plurality of data usage plans 116 available to the user 104. For example, and as described further with reference to the flowcharts, the computing device receives or accesses at least one of the data transfer requests 115 and defines a network data transfer configuration for performing the selected data transfer request 115. For example, the computing device selects one or more of the following: at least one of the data usage plans 116, the mobile operator 111, and at least one of the available network connections 130. Selecting the mobile operator 111 includes, for example, selecting mobile operator credentials to present to the selected network 109 when initiating the data transfer. In some embodiments, selecting the mobile operator 111 includes selecting the international mobile subscriber identity (IMSI) in the SIM 113.

The network data transfer configuration is defined based on, for example, the particular data transfer request 115, the available data usage plans 116 (e.g., data transfer costs, etc.), and the data usage statistics 120 associated with each of the data usage plans 116 (e.g., the amount of network transfer data consumed and/or remaining, etc.). The computing device proceeds to initiate the data transfer request 115 using the defined network data transfer configuration.

Figure 2:
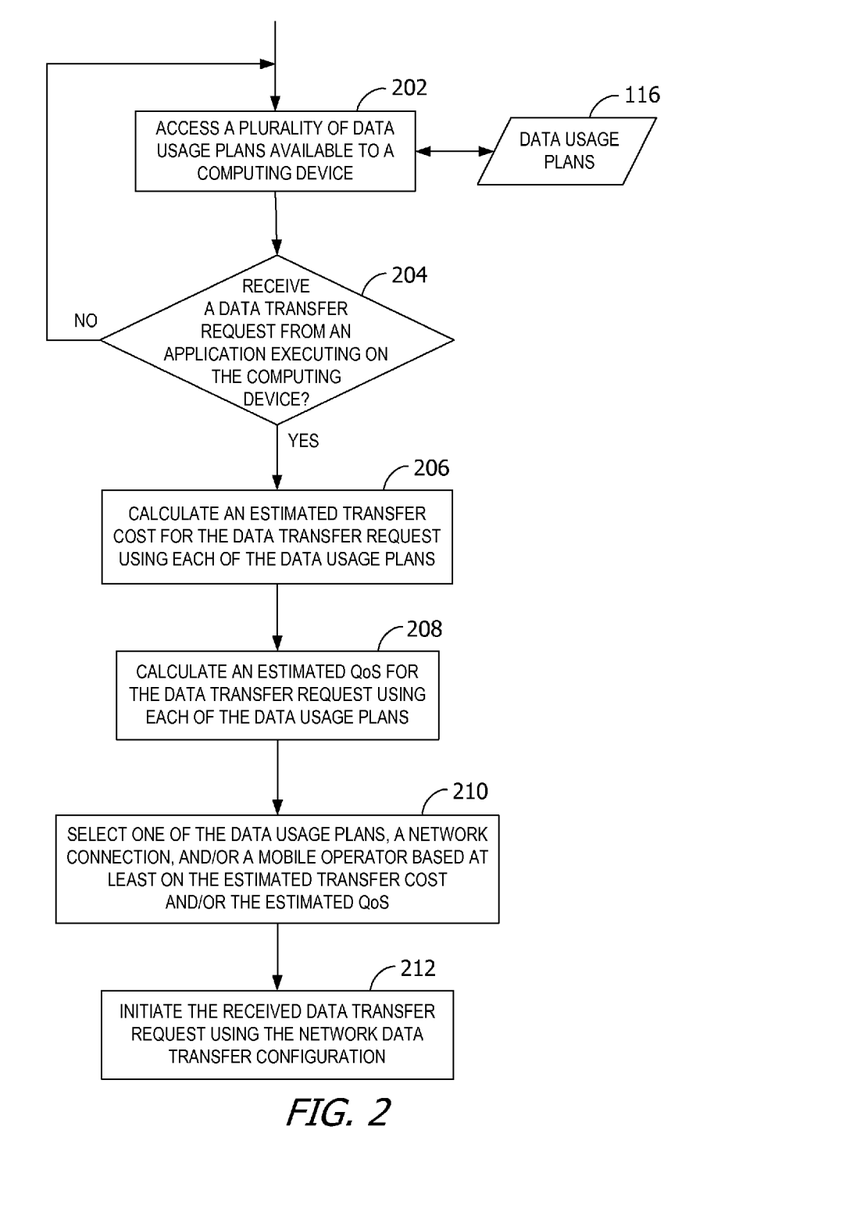
FIG. 2 is an exemplary flow chart illustrating operation of the computing device to select a network data transfer configuration based on estimated transfer costs and/or quality of service metrics using a plurality of data usage plans.

Referring next to FIG. 2, an exemplary flow chart illustrates operation of the computing device to select the network data transfer configuration for performing data transfer requests 115 based on estimated transfer costs and/or quality of service metrics using a plurality of data usage plans 116. While the operations illustrated in FIG. 2 are performed by a mobile computing device 102 in some embodiments, one or more of the operations may be performed by other devices, including any computing device local to, or remote from, the user 104. For example, the operations may be performed by the web service 108, or by a proxy device in communication with the web service 108 and the mobile computing device 102. Further, in some embodiments, the operations illustrated in FIG. 2 are performed by an operating system executing on the mobile computing device 102.

The operations illustrated in FIG. 2 may be described as mapping the data transfer requests 115 to the detected network connections 130 using the plurality of available data usage plans 116 to reduce or minimize data transfer costs and/or provide a QoS suitable for the data transfer requests 115. For example, the computing device works to prevent incurring expensive network transfer costs for the user 104.

In some embodiments, the computing device may store, or have access to, the computer-executable components stored in the memory area 112 to implement one or more of the operations illustrated in FIG. 2. For example, the memory component 128, when executed by the computing device, causes at least one processor 110 to store a plurality of the data usage plans 116 available to the computing device. Each of the data usage plans 116 has data usage statistics 120 associated therewith representing an amount of network data consumed under the data usage plan 116 (e.g., during the current billing cycle).

At 202, the computing device accesses the data usage plans 116 stored by the memory component 128. The communications interface component 126, when executed by the computing device, causes at least one processor 110 to determine whether at least one of the data transfer requests 115 has been received from at least one of a plurality of applications 114 executing on the computing device at 204. In some embodiments, the communications interface component 126 accesses the memory area 112 to retrieve or obtain the data transfer requests 115 that have been stored or queued there by the applications 114. In some embodiments, the communications interface component 126 includes a network interface card and/or computer-executable instructions (e.g., a driver) for operating the network interface card. In some embodiments, the communications interface is operable with near-field communication (NFC) tags.

On receipt of at least one of the data transfer requests 115, the prediction component 122, when executed by the computing device, causes at least one processor 110 to calculate an estimated transfer cost for the data transfer request 115 using each of the data usage plans 116 at 206. For example, the prediction component 122 uses the terms and conditions (e.g., rates, surcharges, etc.) of each of the data usage plans 116 to estimate the cost of transferring data specified by the data transfer request 115.

In some embodiments, the computing device further executes the prediction component 122 to calculate an estimated QoS for the data transfer request 115 using each of the plurality of data usage plans 116 at 208. For example, the prediction component 122 uses the terms and conditions (e.g., rates, surcharges, etc.) of each of the data usage plans 116 to estimate the QoS that would be realized when transferring data specified by the data transfer request 115. The QoS may be defined by latency, throughput, etc. The QoS analysis enables the filter component 124 to meet or exceed user experience immediacy expectations by differentiating the urgency of network traffic. The user experience immediacy expectations may be defined by the users 104, the applications 114, the computing device, the mobile operator 111, and/or the web service 108, in some embodiments. For example, the computing device may receive or access data indicating that while Network A may be cheaper than Network B, the reception on Network A is poor whereas the reception on Network B is good. As such, the filter component 124 may choose to route the traffic on Network B to meet QoS criteria.

The filter component 124, when executed by the computing device, causes at least one processor 110 to define the network data transfer configuration for the data transfer request 115. For example, the filter component 124 selects at least one of the data usage plans 116 and at least one of a plurality of network connections 130 available to the computing device at 210. In some embodiments, the filter component 124 determines which SIM 113 or other credential is attached in a multi-SIM environment. The filter component 124 may implement a best-fit, binary search, neural feedback, or any other algorithm or set of algorithms to produce the output routing decisions or recommendations.

In some embodiments, the filter component 124 selects from a plurality of mobile operators 111. For example, the filter component 124 selects one mobile operator 111 over the others based on the network transfer cost associated with the selected mobile operator 111. In such embodiments, the filter component 124 accesses or receives data describing the available mobile operators 111 in a given locale or area, as well as the costs associated with using each of the mobile operators 111 (e.g., defined in the data usage plans 116 of the mobile operators 111).

The computing device 102 detects, or is informed of, the available network connections 130. For example, the computing device 102 may determine whether the network connection 130 has been established and/or has not expired. As another example, the computing device 102 may send a test packet (e.g., a ping) over each open network connection 130 to confirm the availability of each network connection 130. In some embodiments, the computing device 102 may further classify each of the detected network connections 130. For example, the network connections 130 may be classified according to type, speed, cost, and/or other factors or criteria.

The network data transfer configuration is defined based at least on the estimated transfer costs using the different data usage plans 116 and/or the estimated QoS using the different data usage plans 116. The defined network data transfer configuration, or the mapping between the data transfer request 115 and the network connection 130 may be stored, for example, in a file, table, database, or other data structure.

In a cost-based example, the cost of the duration of the transfer with Network B may ultimately exceed a flat rate cost associated with Network A. In such an example, the filter component 124 calculates an estimated transfer cost over each network 109 and routes the traffic on the lower cost network 109.

The filter component 124 may also consider speed or data transfer rates when defining the network data transfer configuration. For example, if it takes five seconds to transfer two gigabytes of data over Network A but two hours over Network B, the filter component 124 may opt to incur charges with Network A to complete the data transfer faster if completion is a priority or preference for the user 104 or requesting application 114.

The data transfer request 115 is then initiated at 212 using the defined network data transfer configuration (e.g., the selected data usage plan 116, network connection 130, and/or mobile operator 111). For example, the computing device 102 directly initiates the data transfer request 115, or the computing device 102 may notify the application 114 that submitted the data transfer request 115 of the defined network data transfer configuration to enable that application 114 to initiate the data transfer request 115.

In some embodiments, the filter component 124 performs, or relies on the output of, a cost-benefit analysis based on the estimated transfer cost and/or the estimated QoS. For example, the filter component 124 selects the data usage plan 116, the network connection 130, and/or the mobile operator 111 with the lowest estimated transfer cost and/or highest estimated QoS. In general, the filter component 124 determines which network connection 130 to use for which data transfer request 115 and for what duration.

In an example in which a first data usage plan has additional network data consumption available while a second data usage plan has no additional network data consumption available without incurring excess charges fees, the filter component 124 selects the first data usage plan to prevent overage charges. The first data usage plan may represent a family data usage plan 116, or other shared data usage plan 116.

In some embodiments, the computing device 102 tracks a cumulative amount of data transfers occurring under each of the data usage plans 116 to identify data usage plans 116 with remaining capacity. The computing device 102 compares the tracked, cumulative amounts to the corresponding threshold values 118 associated with the data usage plans 116. The computing device 102 maps the data transfer requests 115 to the data usage plans 116 based on the comparison. For example, the computing device 102 determines whether the tracked, cumulative amounts for each data usage plan 116 are less than the corresponding threshold values 118 for that data usage plan 116. If the computing device 102 determines that there is remaining network data consumption available under a particular one of the data usage plans 116 (e.g., the cumulative amounts are less than the threshold values 118 for that data usage plan 116), the computing device 102 may match the data transfer request to that particular data usage plan 116. For the data usage plans 116 under which no further data consumption is available or under which the estimated transfer cost is above a pre-defined threshold, the computing device 102 removes those data usage plans 116 from consideration when mapping the data transfer requests 115 to the data usage plans 116. In a further embodiment, the data usage plans 116 with remaining capacity may be ranked or sorted according to remaining capacity.

Some embodiments evaluate the data transfer statistics associated with each of the data usage plans 116 to determine whether the user 104 is Off Track, On Track, Under Track, or Over Limit for usage compared to the consumption allotted under each of the data usage plans 116. For example, given the day of the billing cycle and the current or up-to-date data consumption for the billing period, an extrapolation or projection is performed to predict the consumption associated with the end of the billing cycle. In some embodiments, Off Track may be defined as the user 104 being on or above the projected limit (e.g., the value of the curve) given the day of the billing cycle and the current or up-to-date data consumption for the billing period. On Track may be defined, in some embodiments, as the user 104 being at least 5% below the projected limit given the day of the billing cycle and the current or up-to-date data consumption for the billing period. Under Track may be defined, in some embodiments, as the user 104 being at least 20% below the projected limit given the day of the billing cycle and the current or up-to-date data consumption for the billing period. Some embodiments contemplate an "Over Limit" category that allows users 104 to opt out of data consumption by background transfers unless the background transfers are user-initiated or deemed critical.

In some embodiments, the mobile computing device 102 further includes a user interface component that includes a graphics card for displaying data to the user 104 and for receiving data from the user 104. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the mobile computing device 102 in a particular way. In some embodiments, the user interface component executes to present offers for adjusting a particular network data transfer configuration, such as described with reference to FIG. 3.

The communications interface component 126 may execute independently of the other computer-executable components (e.g., not sequentially, or without interaction or dependency on another component). For example, the communications interface component 126 may be executed by a thread separate from other thread(s) executing the memory component 128, the prediction component 122, and the filter component 124.

The defined network data transfer configuration represents a network transfer decision made by the computing device or other entity (e.g., the web service 108). In some embodiments, such network transfer decisions by a plurality of the computing devices may be crowdsourced to, for example, the web service 108 or a particular one of the computing devices. In this manner, the crowdsourced network data transfer decisions may be analyzed to identify patterns therein.

In a crowdsourcing embodiment, the web service 108 observes and crowdsources the network transfer decisions and/or behavior/patterns of the users 104. For example, the web service 108 crowdsources data about users 104, such as the network transfers decisions made by the devices of the users 104, to then automate future network transfer decisions by the devices. For example, the web service 108 may conclude, across a plurality of users 104, that the users 104 tend to prefer particular network connections 130 or mobile operators 111 in particular situations. Alternatively or in addition, the web service 108 analyzes the crowdsourced data to determine which decisions worked best for the users 104 (e.g., was the call completed or disconnected, and in which areas), and/or which data usage plans 116 were frequently selected by the user 104. The analysis may include a neural network or a Bayesian analysis to base future routing decisions on past input, decisions, or other patterns or behavior of the user 104. In some embodiments, the web service 108 prioritizes particular networks 109 and mobile operators 111 in each of the situations (e.g., areas) observed by the web service 108. The web service 108 then applies these conclusions and analysis to future routing decisions for any of the users 104. For example, the web service 108 distributes the information to the user computing devices for application.

Figure 3:
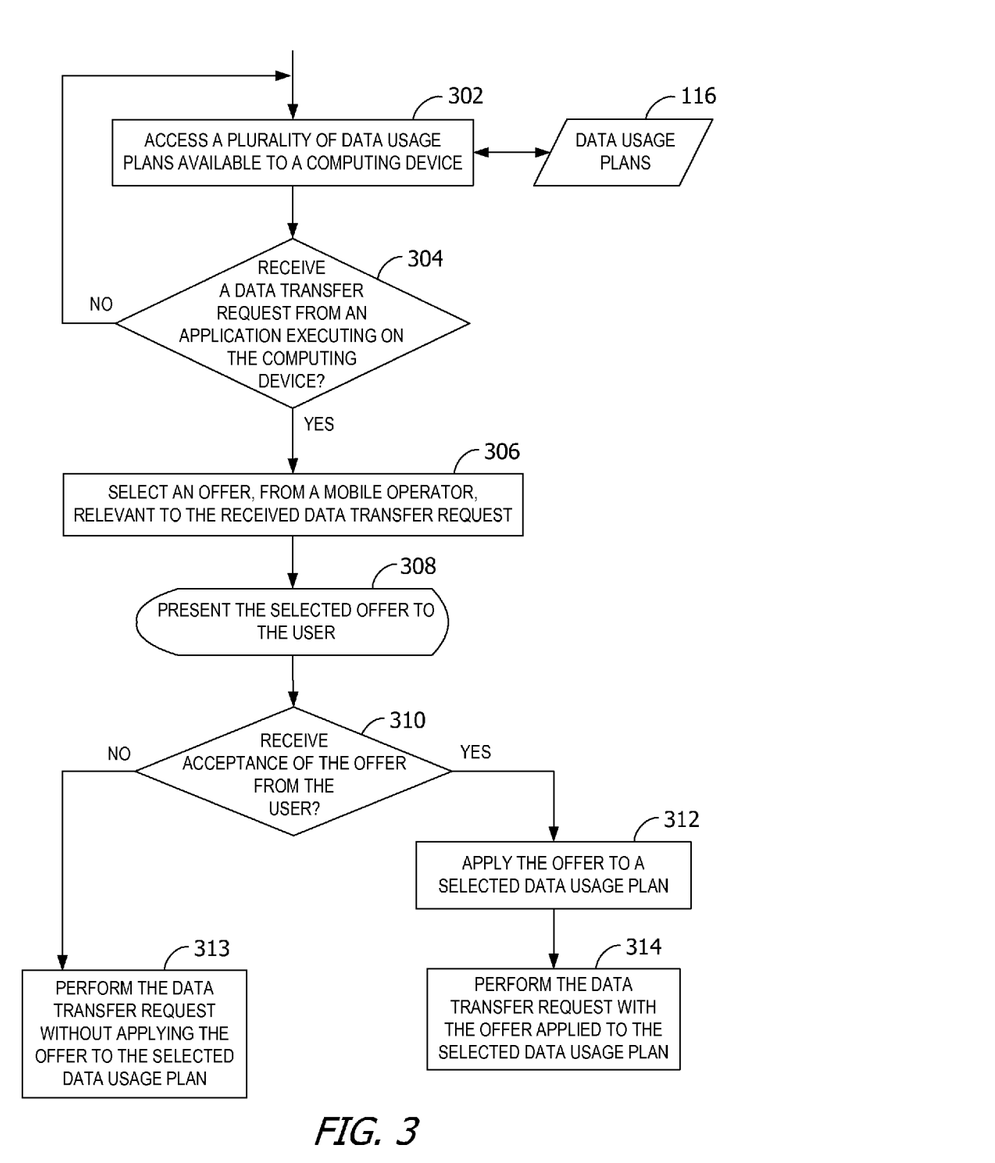
FIG. 3 is an exemplary flow chart illustrating operation of the computing device to present offers to a user for adjusting a network data transfer.

Referring next to FIG. 3, an exemplary flow chart illustrates operation of the computing device to present offers to the user 104 for adjusting a network data transfer. While the operations illustrated in FIG. 3 are performed by the mobile computing device 102 in some embodiments, one or more of the operations may be performed by other devices, including any computing device local to, or remote from, the user 104. For example, the operations may be performed by the web service 108, or by a proxy device in communication with the web service 108 and the mobile computing device 102. Further, in some embodiments, the operations illustrated in FIG. 3 are performed by an operating system executing on the mobile computing device 102.

In general, the computing device surfaces offers from the mobile operators 111 that may be of interest to the user 104, at a time when the user 104 may opt for the offer. The service may make recommendations to accept the offer based on cost, QoS, user preferences, application preferences, timeliness, and/or relevancy of the data (e.g., stock quotes), etc.

At 302, the computing device accesses a plurality of the data usage plans 116 available to the computing device (e.g., stored in the memory area 112). On determining that at least one of the data transfer requests 115 from at least one of the data usage plans 116 has been received at 304, the computing device selects an offer based on the received data usage request at 306 and based on the data usage plan 116 selected to implement the data transfer request 115. The selected offer is thus relevant to the data transfer request 115. For example, if the data transfer request 115 is to stream a movie, the computing device may select an offer that includes a temporary but instant increase in a data transfer rate to enable streaming of a high-definition version of the movie, in return for a one-time fee from the user 104.

The offer is selected from a plurality of offers provided by the mobile operators 111. The plurality of offers may be stored in the memory area 112, or in another memory accessible to the computing device (e.g., in the cloud service). In general, the offers adjust the selected data usage plan 116 for performance of the data transfer request 115.

The computing device may perform an analysis on each of the offers available for the selected data usage plan 116. For example, a cost-benefit analysis may be performed to estimate the transfer costs and/or QoS characteristics associated with performance of the data transfer request 115 after a simulated application of each of the offers. In this manner, the computing device is able to determine whether to recommend acceptance or rejection by the user 104 to the offer.

At 308, the selected offer is presented to the user 104 for review and authorization. For example, the computing device may display a popup, tile, or toast to the user 104. In some embodiments, tiles represent tile user interface elements. On receiving acceptance of the offer from the user 104 at 310, the computing device applies the approved offer to the data usage plan 116 selected for performance of the data transfer request 115 at 312. At 314, the computing device performs the data transfer request 115 using the selected data usage plan 116 with the offer applied thereto. If the user 104 declines the offer at 310, the computing device performs the data transfer request 115 at 313 using the selected data usage plan 116 without the offer being applied thereto.

In some embodiments, the computing device presents "turbo" offers to the user 104 to instantly increase the data transfer rate of the current network connection 130. The offer may, for example, boost the speed of the network connection 130 for some cost (e.g., a dollar, quarter, etc.) for some duration (e.g., a couple of hours, an afternoon, a day).

Figure 4:
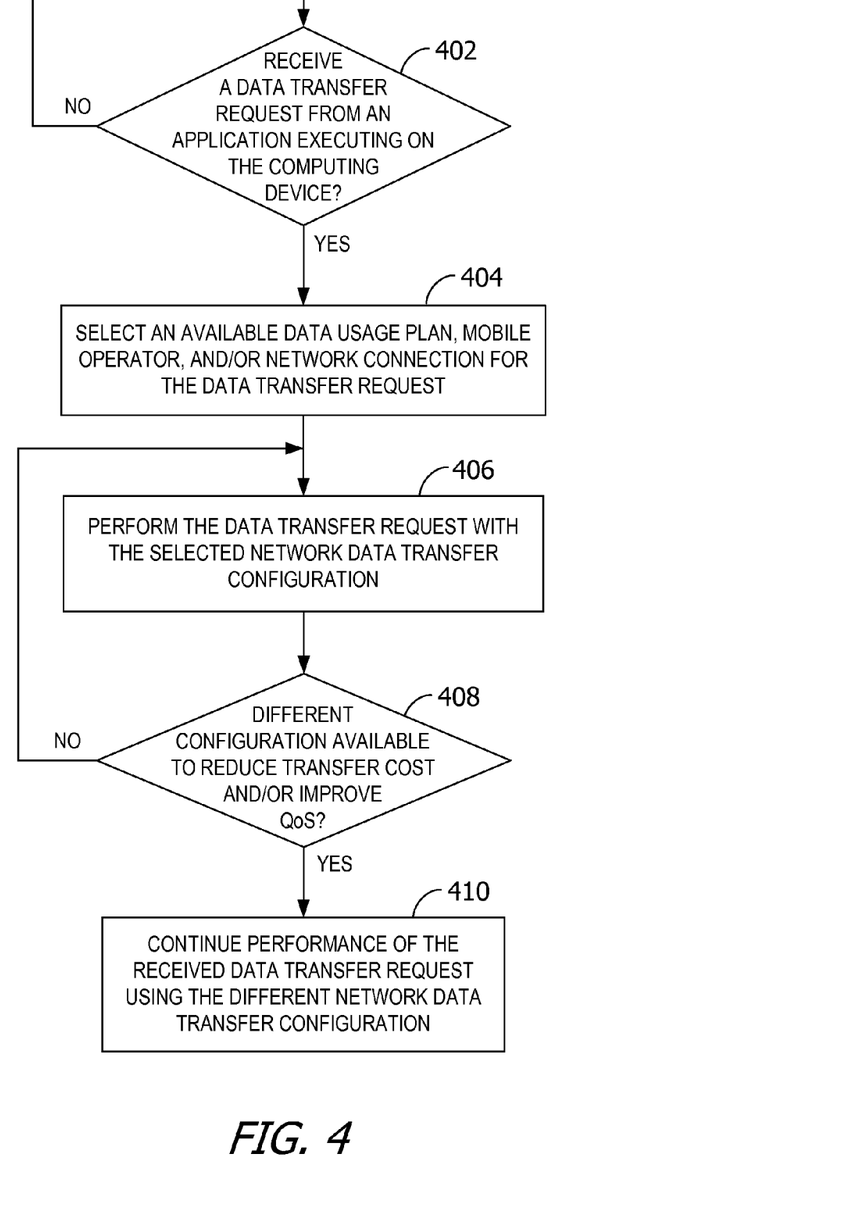
FIG. 4 is an exemplary flow chart illustrating operation of the computing device to adjust a network data transfer configuration during performance of a data transfer request.

Referring next to FIG. 4, an exemplary flow chart illustrates operation of the computing device to adjust a network data transfer configuration during performance of one of the data transfer requests 115. While the operations illustrated in FIG. 4 are performed by a mobile computing device 102 in some embodiments, one or more of the operations may be performed by other devices, including any computing device local to, or remote from, the user 104. For example, the operations may be performed by the web service 108, or by a proxy device in communication with the web service 108 and the mobile computing device 102. Further, in some embodiments, the operations illustrated in FIG. 4 are performed by an operating system executing on the mobile computing device 102.

On determining that at least one of the data transfer requests 115 has been received from at least one of the applications 114 at 402, the computing device defines the network data transfer configuration. For example, the computing device de-queues at least one of the queued data transfer requests 115 and selects one of the data usage plans 116 (e.g., associated with one of the mobile operators 111) and one of the network connections 130 at 404. At 406, the computing device initiates or performs the data transfer request 115 using the defined network data transfer configuration.

During performance of the data transfer request 115, the computing device determines if another network data transfer configuration is more suitable for completing the in-progress data transfer request 115. For example, if another data usage plan 116 becomes available, if the computing device detects a Wi-Fi access point, or if the current time moves from a peak period to an off-peak period, the computing device may conclude that the data transfer request 115 should be completed under another one of the plurality of data usage plans 116 available to the computing device. Continuing the above example, the computing device may select one of the data usage plans 116 that offers a lower transfer cost, free Wi-Fi, or free off-peak transfers, respectively.

On determining that a different network data transfer configuration should be selected to reduce transfer costs or improve QoS at 408, the computing device changes from the current network transfer configuration to the newly-selected network data transfer configuration during performance of the data transfer request 115. That is, the computing device continues performance of the data transfer request 115 at 410 using the newly-selected network data transfer configuration.

The operations illustrated in FIG. 4 execute to, for example, perform in-call switching to reduce costs and/or improve QoS. In such an example, the computing device performs an in-call switchover or handoff by selecting a second data usage plan after initiation of the data transfer request 115 on a first data usage plan. The switchover may occur after the computing device determines that an estimated transfer cost of the second data usage plan is less than an estimated transfer cost of the first data usage plan. For example, the computing device may switch a call from a cellular network connection to a Voice Over Internet Protocol (VoIP) call over a Wi-Fi connection.

In another example, the user 104 may receive a voice call over a cellular network connection. The computing device determines that the call is international, and switches the call to one of the data usage plans 116, network connection 130, and mobile operator 111 that is less expensive for international calls.

Aspects of the disclosure are operable with the computing device or other connection management service performing operations to transparently (to the user 104) change data usage plans 116 during performance of the data transfer request 115. In event-driven models, the connection management service notifies the application 114 associated with the in-progress data transfer request 115 that the application 114 should reconnect using another data usage plan 116. In still other embodiments, the connection management service relies on a published protocol recognizable by both endpoints to implement the switchover.

ADDITIONAL EXAMPLES

In one example, Mobile Operator A may offer a free month of Internet while Mobile Operator B may not. Aspects of the disclosure route data traffic via Mobile Operator A during that free month, but then automatically switch to Mobile Operator B at the end of the first month to avoid incurring charges from Mobile Operator A, which is more expensive than Mobile Operator B. To switch to Mobile Operator B, the mobile computing device 102 or web service 108 handling the data transfer requests 115 identifies another SIM 113 available on the device, dynamically switches to Mobile Operator B, and applies the data usage plan 116 (e.g., tariffs) associated with Mobile Operator B.

In another example, the user 104 lands in a foreign country and the user's mobile telephone connects to a service (e.g., the web service 108) that determines that data transfer may be expensive in that country based on the current data usage plan 116 of the user 104. The web service 108 tells the mobile phone of an embedded SIM enablement that may offer cheaper, faster, or otherwise better network transfers. The embedded SIM enablement is software capable of being installed on the mobile telephone upon arrival in the foreign country, and upon consent from the user 104, that enables the mobile telephone to connect to networks of local mobile operators 111.

Alternatively or in addition, the mobile telephone may present and/or recommend a particular offer or package from one of the available mobile operators 111 that the service concludes is the most cost effective or otherwise "better" based on the user's historical data use, anticipated data use, or both. The service considers anticipated multimedia messaging service (MMS), short message service (SMS), and other traffic when determining which data usage plan 116 and/or mobile operator 111 to recommend to the user 104 in that foreign country.

In some embodiments, an event scheduler and a core networking component implement aspects of the disclosure. The event scheduler executes on the computing device to assign the data transfer requests 115 to the data usage plans 116. In such an environment, one or more of the applications 114 registers with the event scheduler. The core networking component executes on the computing device 102 to detect the network connections 130 available to the computing device 102, analyze each of the network connections 130 continuously (e.g., without interruption) or continually (e.g., periodically), such as every minute. In other embodiments, the core networking component analyzes each of the network connections 130 upon receiving the data transfer request 115 from one of the applications 114. The core networking component may also have different schedules for checking different network connections 130. For example, the core networking component may check the availability of a Wi-Fi connection less frequently than the availability of a roaming cellular connection. The core networking component notifies the event scheduler of the presence and/or absence of the network connections 130. Upon receipt of this notification, the event scheduler maps or matches the queued data transfer requests 115 to one of the data usage plans 116 that use the available network connections 130.

In one scenario, an enterprise information technology entity pushes down policies governing enterprise preferences relating to connectivity. For example, the entity transmits the policies to each of the devices associated with the enterprise. The policies may be based on enterprise agreements with particular carriers. Aspects of the disclosure then operate to prefer those particular carriers when selecting carriers for initiation of the data transfer requests, in accordance with the policies. The policies may also interrelate to other policies that define constraints or preferences, such as those associated with security. For example, a government contractor may be required to route secure network traffic over one particular carrier.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in the flowcharts may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Input from the user 104 may be explicit (e.g., user-specified preferences or consent) or implicit (e.g., the computing device makes intelligent decisions for the user 104). In some embodiments, the computing device obtains the user's consent to operate. The user preferences indicate, for example, whether the user 104 prefers one network 109 over another, one mobile operator 111 over another, quality over cost, speed over duration, etc.

After obtaining the user's consent to execute and to obtain the data usage plans 116 of the user 104, the service in some embodiments pulls all the necessary information (e.g., data usage plans 116, deals, offers, etc.) from third parties such as the mobile operators 111, a cloud service, or other entity, without involving the user 104 to ensure a seamless user experience. In such embodiments, the service may further switch among data usage plans 116 and mobile operators 111 to best meet the specified or default preferences of the user 104.

The computing device may present the routing decisions to the user 104 for approval or selection before implementing the routing decisions. In some embodiments, the user 104 may not yet have any of the data usage plans 116, or may be open to other data usage plans 116. In such embodiments, the computing device may present data usage plan offers from the available mobile operators 111 to the user 104 for selection.

Exemplary Operating Environment

Aspects of the disclosure are capable of operation and/or display on any computing device or screen. For example, the user 104 may move between a mobile device, a gaming console, an in-vehicle computing system (e.g., entertainment and/or navigation), a portable media player, and a laptop.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

The embodiments illustrated and described herein as well as embodiments not specifically described herein but within the scope of aspects of the invention constitute exemplary means for selecting among the plurality of data usage plans 116 available to the mobile computing device 102 for performing network data transfers.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for managing data transfers with a plurality of data usage plans, said system comprising:
    a memory area associated with a mobile computing device, said memory area storing a plurality of data usage plans available to the mobile computing device, the plurality of data usage plans having respective data usage statistics associated therewith representing an amount of network data consumed under a respective one of the plurality of data usage plans; and
    a processor programmed to:
        receive a data transfer request from at least one of a plurality of applications executing on the mobile computing device; and
        select, based at least on the plurality of data usage plans, the associated data usage statistics, and the received data transfer request, a mobile operator and at least one network connection available to the mobile computing device to initiate the received data transfer request, wherein the mobile computing device has a plurality of radios with at least two of the plurality of radios consuming a battery at differing rates, wherein the mobile operator and the at least one network connection are selected to balance network data usage against battery usage.

2. The system of claim 1, wherein the processor is programmed to select the mobile operator by selecting mobile operator credentials to present to the selected at least one network connection for the received data transfer request.

3. The system of claim 1, wherein the mobile computing device has dual subscriber identity modules (SIMs) with one of the SIMs in standby mode, and wherein the processor is programmed to select at least one of the SIMs to initiate the received data transfer request.

4. The system of claim 1, wherein the mobile computing device has dual subscriber identity modules (SIMs) with a first SIM and a second SIM being independently active, and wherein the processor is programmed to dynamically select at least one of the SIMs to initiate the received data transfer request.

5. The system of claim 1, wherein the received data transfer request represents an incoming voice call on a first data usage plan of a first subscriber identity module (SIM), and wherein the processor is programmed to answer the incoming voice call on a second data usage plan of a second SIM.

6. The system of claim 1, further comprising means for selecting among the plurality of data usage plans available to the mobile computing device for performing network data transfers.

7. The system of claim 1, wherein at least one offer from the selected mobile operator is presented to a user of the mobile computing device based on the received data transfer request to adjust one of the plurality data usage plans for performance of the received data transfer request.

8. A method comprising:
accessing a plurality of data usage plans available to a computing device, the plurality of data usage plans having respective data usage statistics associated therewith representing an amount of network data consumed under a respective one of the plurality of data usage plans;
receiving a data transfer request from at least one of a plurality of applications executing on the computing device; and
selecting, based at least on the accessed plurality of data usage plans, the associated data usage statistics, and the received data transfer request, a mobile operator and at least one network connection available to the computing device to initiate the received data transfer request, wherein the computing device has a plurality of radios with at least two of the plurality of radios consuming a battery at differing rates, wherein the mobile operator and the at least one network connection are selected to balance network data usage against battery usage.

9. The method of claim 8, further comprising presenting, to a user of the computing device based on the received data transfer request, at least one offer from the mobile operator to adjust one of the accessed plurality of data usage plans for performance of the received data transfer request.

10. The method of claim 9, further comprising performing a cost-benefit analysis of the presented offer, and determining whether to recommend to the user that the user accept the presented offer based the performed cost-benefit analysis.

11. The method of claim 9, wherein presenting the at least one offer includes presenting an offer to instantly increase a data transfer rate for the received data transfer request.

12. The method of claim 8, wherein selecting the network connection represents a network transfer decision for the computing device, and further comprising crowdsourcing the network transfer decisions of a plurality of computing devices to identify patterns in the network transfer decisions.

13. The method of claim 8, wherein the plurality of data usage plans includes a first data usage plan with additional network data consumption available and a second data usage plan without additional network data consumption available, and wherein the first data usage plan is selected to prevent overage charges.

14. The method of claim 13, wherein the first data usage plan is associated with a family data usage plan.

15. The method of claim 8, further comprising selecting a first data usage plan over a first network connection, and further comprising performing an in-call switch over by selecting a second data usage plan after initiation of the received data transfer request on the first data usage plan over the first network connection on determining that an estimated transfer cost of the second network connection is less than an estimated transfer cost of the first network connection.

16. One or more computer storage media embodying computer-executable components, said components comprising:
a memory component that upon execution causes at least one processor to store a plurality of data usage plans available to a computing device, the plurality of data usage plans having respective data usage statistics associated therewith representing an amount of network data consumed under a respective one of the plurality of data usage plans;
a communications interface component that upon execution causes at least one processor to receive a data transfer request from at least one of a plurality of applications executing on the computing device; and
a filter component that upon execution causes at least one processor to select, based at least on the plurality of data usage plans, the associated data usage statistics, and the received data transfer request, a mobile operator and one of a plurality of network connections available to the computing device to initiate the data transfer request received by the communications interface component, wherein the computing device has a plurality of radios with at least two of the plurality of radios consuming a battery at differing rates, wherein the mobile operator and the one of a plurality of network connections are selected to balance network data usage against battery usage.

17. The computer storage media of claim 16, further comprising a prediction component that upon execution causes at least one processor to estimate a quality of service (QoS) and a transfer cost associated with each of the plurality of data usage plans, and wherein the filter component further selects one of the data usage plans based on the QoS estimated by the prediction component.

18. The computer storage media of claim 17, wherein the filter component performs a cost-benefit analysis for each of the plurality of data usage plans based on the estimated transfer cost and/or the estimated QoS.

19. The computer storage media of claim 18, wherein the filter component selects one of the plurality of data usage plans with the lowest estimated transfer cost and/or highest estimated QoS.

20. The computer storage media of claim 17, wherein the filter component further selects the mobile operator based at least on the estimated transfer cost calculated by the prediction component.

* * * * *